3,149,284
**TEST DEVICE FOR SIGNAL-RADIATING AND
-RECEIVING EQUIPMENT**
Lloyd S. Kishinsky, Woodmere, N.Y., assignor to Republic Aviation Corporation, Farmingdale, N.Y., a corporation of Delaware
Filed Oct. 19, 1962, Ser. No. 231,781
5 Claims. (Cl. 325—67)

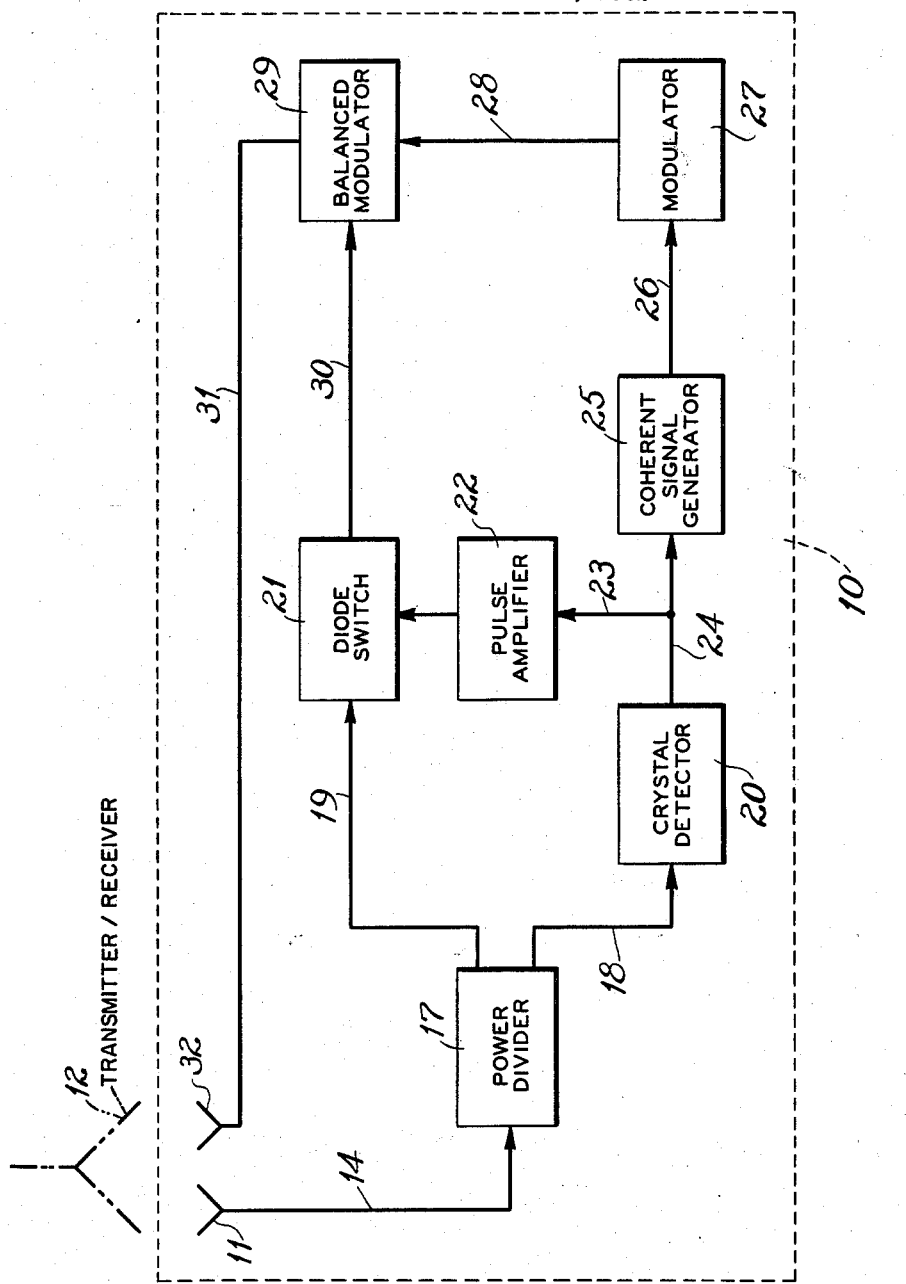

This invention relates to test devices for checking the operation and efficiency of signal-radiating and -receiving equipment and, more particularly, to such a device in which a frequency sample is extracted from the original signal generated by the radiating equipment and converted or developed into a selected return signal that is coherent with the original signal.

Among other things, the present invention proposes to employ a spurious or parasite frequency inherent in the signal emanating from the radiating equipment under test and to divide this composite signal into two independent paths for separate and individual treatment. In one of these paths the parasite signal is extracted, resulting in a comparatively pure carrier signal. In the other path an auxiliary signal having a frequency equal to the difference between that of the basic signal and that of the parasite signal is extracted. The auxiliary signal thus isolated is then treated as required to produce a modulated signal corresponding to and simulating a signal to be received by the equipment in actual operation. This modulated signal will be coherent with the original signal from the radiating equipment since the auxiliary signal from which it is produced constitutes a sample of the original signal.

By thus producing an auxiliary signal of substantially lower frequency than that of the original signal from the radiating equipment, the modulation thereof, e.g., shaping, delay, frequency shifting, etc., is greatly facilitated by appreciably simplifying the requirements of associated devices capable of effecting such modulation. Having been thus modulated, the auxiliary signal may be thereafter mixed with the carrier signal and retransmitted to the equipment under test for the operation thereof whereby its efficiency may be determined.

Moreover, the design of the present test device is such that coupling of the radiating equipment to the test device requires no positive connections or breaking into the radiating equipment. In short, this tester may be space-coupled to the associated radiating equipment through their respective antennae. Hence, the instant tester may comprise a compact, integral unit that is completely self-contained.

With the above and other objects in view, as will be apparent, this invention consists in the construction, combination and arrangement of parts, all as hereinafter more fully described, claimed and illustrated in the accompanying drawing, wherein a tester constructed in accordance with the teachings herein is shown in block diagram associated with the transmitting and receiving element of radiating equipment (not shown).

Referring more specifically to the drawing, 10 designates a preferred embodiment of a tester to check the operation and efficiency of signal-transmitting and -receiving equipment. This tester 10 is a compact, self-contained unit comprising a combination of microwave and electrical components interconnected in an operative circuit so as to receive signals emanating from the signal-radiating unit under test, convert them into signals corresponding to those to be received by the unit during actual operation, and return these signals thus converted to the unit. Thus, the equipment under test is put through its several operating modes, simulating actual use, and its efficiency under each such mode is checked.

To the above ends, the tester 10 is brought into position relative to the unit under test whereby a pickup antenna 11 on the tester 10 is disposed within the radiating field of the transmitting/receiving antenna 12 of the unit. The radiating equipment is then energized and operated successively at each mode for which it is designed.

Existing transmitting units radiate signals which include a basic sideband frequency together with spurious signal frequencies including the suppressed carrier, unwanted sidebands and local oscillator radiation insignificant in the normal operation thereof. During transmission any such frequencies that interfere with or are objectionable are customarily filtered out. However, the rejection of these objectionable signals is not complete and they do appear during transmission at greatly reduced levels with respect to the basic frequency.

For the purpose of generating a signal compatible with the radiating equipment, the tester 10 includes a waveguide 14 for the transmission of a signal of composite frequency, i.e., the basic sideband frequency and an inherent suppressed carrier frequency of relatively low power emanating from the equipment to a power divider 17. The divider 17 separates this signal of composite frequency into individual paths through the lines 18 and 19.

A crystal detector 20 is provided in the line 18 to extract from the composite signal an auxiliary signal having a frequency equal to the difference between the frequencies of the carrier and basic sideband signal. A filter such as, for example, a diode switch 21 is provided in the line 19, on the other hand, to suppress the sideband signal whereby the carrier signal in comparatively pure form alone passes.

Operation of the diode switch 21 is synchronized with the signal from the crystal detector 20 by means of a broadband amplifier such as a pulse amplifier 22 with suitable phase and amplitude shaping networks operatively connected in a waveguide 23 between the switch 21, and a transmission line 24 between the detector 20 and a coherent signal generator 25 such as, for example, a burst amplifier. Thus, the auxiliary signal from the detector 20 is amplified at 22 without affecting the wave-shape thereof for actuation of the switch 21 accordingly.

The coherent signal generator or burst amplifier 25 is in essence a shaping amplifier and a ringing circuit such as a crystal filter in cascade or series. Its function is to convert the auxiliary signal which is comprised of pulsed signals at the same frequency to a continuous wave signal at the same frequency. The continuous wave signal thus produced is coherent with the signal generated within the radiating equipment 12 and is transmitted to the operating mechanism of the tester 10 through lines 26. This operating mechanism may comprise a modulator 27 the function of which is to modify the auxiliary signal in accordance with an associated control or programmer (not shown) to effect the desired frequency translation, shaping, delay, etc.

Thereafter, the auxiliary signal thus modulated is transmitted through a line 28 to a mixer such as a balanced modulator 29 to which the carrier signal from the diode 21 is also delivered through a line 30. The resulting signal from the balanced modulator 29 includes the frequency resulting from the programmed modification by the associated control in the modulator 27, simulating a return signal received by the transmitter/receiver 12 of the radiating unit during each different mode of its actual operation. This return signal is transmitted from the modulator 29 through a line 31 to a transmitting antenna 32 disposed within the pickup range of the receiver 12. Hence, the radiating unit may be put through its several operations in the same manner as in actual use, whereby its efficiency may be tested.

While none of the several components of the system as described is in and of itself new, the combination thereof to produce the result contemplated herein is novel. Moreover, none of these components, per se, is critical to an accomplishment of the desired result, as other equivalent components are available from the existing art. In essence, the invention resides in a test device predicated on the novel concept of extracting an auxiliary signal from the transmission of a radiating equipment signal, containing a basic signal frequency and an undesirable or parasite signal, operating on this extracted signal alone to effect the desired modulation, combining it, after modulation, with the parasite carrier signal, and retransmitting the modulated signal to the radiating equipment.

What is claimed is:

1. A test device for signal-radiating and -receiving equipment of the type which is adapted to transmit and receive signals having a carrier component and at least one sideband component comprising signal pickup means disposed in the field of radiation of said equipment to receive signals therefrom, a signal separator coupled to said signal pickup means for dividing said received signals into two distinct flow paths, filtering means coupled to one of said flow paths, said filtering means being so constructed as to transmit substantially only the carrier components of said received signals, a detector coupled to the other of said flow paths, said detector being so constructed as to produce output signals of a frequency equal to the difference in frequency between the carrier and sideband components of said received signals, a signal generator coupled to the output of said detector for producing a continuous wave signal in response to said output signals, a modulator coupled to said signal generator for modulating said continuous wave signal in accordance with externally supplied control inputs, a mixer coupled to said modulator and said filtering means for producing return signals by combining said carrier components transmitted through said filtering means with the modulated continuous wave signal aforesaid, and means for transmitting said return signals to said equipment.

2. The test device of claim 1 wherein said filtering means includes switching means synchronized for actuation in unison with said output signals from the detector.

3. The test device of claim 1 wherein said filtering means comprises a diode switch actuated by a broadband amplifier having pulse-shaping networks and is operatively connected between said diode switch and said detector.

4. The test device of claim 1 wherein said continuous wave signal produced by the signal generator is of the same frequency as the detector output signal.

5. The test device of claim 4 wherein the mixer for producing return signals is a balanced modulator.

References Cited in the file of this patent

UNITED STATES PATENTS

| | | |
|---|---|---|
| 2,421,016 | Deloraine et al. | May 27, 1947 |
| 2,706,244 | Kuder | Apr. 12, 1955 |
| 2,775,759 | Okrent | Dec. 25, 1956 |
| 2,820,138 | Haard | Jan. 14, 1958 |
| 2,922,157 | McShan | Jan. 19, 1960 |
| 2,942,257 | Huntington | June 21, 1960 |
| 3,090,955 | Hubka et al. | May 21, 1963 |